(12) United States Patent
Cho et al.

(10) Patent No.: US 8,059,666 B2
(45) Date of Patent: Nov. 15, 2011

(54) BRIDGE-BASED RADIO ACCESS STATION BACKBONE NETWORK SYSTEM AND SIGNAL PROCESSING METHOD THEREFOR

(75) Inventors: Jae-Hun Cho, Suwon-si (KR); Hoon Kim, Suwon-si (KR); Seong-Taek Hwang, Pyeongtaek-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 915 days.

(21) Appl. No.: 11/958,439

(22) Filed: Dec. 18, 2007

(65) Prior Publication Data

US 2008/0151914 A1 Jun. 26, 2008

(30) Foreign Application Priority Data

Dec. 20, 2006 (KR) .................. 10-2006-0130936

(51) Int. Cl.
*H04L 12/28* (2006.01)
(52) U.S. Cl. .................. 370/401; 455/445; 370/389
(58) Field of Classification Search .................. 370/389, 370/390, 401
See application file for complete search history.

(56) References Cited

U.S. PATENT DOCUMENTS

| 6,804,221 B1* | 10/2004 | Magret et al. .................. 370/338 |
| 2003/0003911 A1 | 1/2003 | Foster et al. |
| 2003/0003915 A1 | 1/2003 | Foster et al. |
| 2003/0050078 A1* | 3/2003 | Motegi et al. .................. 455/456 |
| 2003/0174688 A1* | 9/2003 | Ahmed et al. .................. 370/349 |
| 2004/0002337 A1* | 1/2004 | Wheeler et al. .................. 455/445 |
| 2004/0057393 A1 | 3/2004 | Bianchi et al. |
| 2006/0098620 A1 | 5/2006 | Zhou et al. |
| 2006/0209760 A1* | 9/2006 | Saito et al. .................. 370/331 |
| 2007/0127423 A1* | 6/2007 | Ho .................. 370/338 |
| 2008/0013538 A1* | 1/2008 | Lee et al. .................. 370/390 |
| 2008/0103973 A1* | 5/2008 | Park et al. .................. 705/51 |
| 2008/0205393 A1* | 8/2008 | Jeong .................. 370/389 |

FOREIGN PATENT DOCUMENTS

KR 2006-52112 5/2006

* cited by examiner

*Primary Examiner* — Robert Wilson
*Assistant Examiner* — Mandish Randhawa
(74) *Attorney, Agent, or Firm* — Cha & Reiter, LLC

(57) ABSTRACT

A signal processing method in a bridge-based RAS backbone network system is provided, in which an MN within a network periodically transmits to an HLR a route-update message for registration updating, if the MN is in active mode and transmits to the HLR a paging-update message having a transmission period longer than that transmission period of the route-update message, for registration updating, if the MN is in idle mode, each of bridges and the HLR stores location information about the MN in a soft state with an age set for the location information in a routing cache according to the route-update message received from the MN, and each of BSBs, SCBs, and an SIB selected from a plurality of SIBs stores location information about the MN in a soft state with an age set for the location information according to the paging-update message received from the MN.

10 Claims, 8 Drawing Sheets

BRIDGE-BASED RADIO ACCESS STATION BACKBONE NETWORK SYSTEM AND SIGNAL PROCESSING METHOD THEREFOR

CLAIM OF PRIORITY

This application claims the benefit under 35 U.S.C. §119(a) of a Korean Patent Application filed in the Korean Intellectual Property Office on Dec. 20, 2006 and assigned Ser. No. 2006-130936, the entire disclosure of which is hereby incorporated by reference,

BACKGROUND OF THE INVENTION

1. Field of the Invention

The present invention generally relates to Ethernet extension. More particularly, the present invention relates to a bridge-based Radio Access Station (RAS) backbone network system in which a RAS backbone network that forms the backbone of a wireless system is built by Ethernet technology and a signal processing method therefore.

2. Description of the Related Art

Ethernet is one of the most widely used technologies for Local Area Network (LAN). Due to its universality and simple structure, the use of Ethernet is being extended to very LAN and Wide Area Network (WAN).

FIG. 1 illustrates an exemplary configuration of a conventional Wireless Broadband (WiBro) RAS backbone network. Referring to FIG. 1, the WiBro RAS backbone network includes a plurality of RASs 10 and Access Control Routers (ACRs) 12 for controlling the RASs 10. The WiBro network may further include a Home Agent (HA, not shown) for supporting the mobility of Mobile Nodes (MNs) and an Authentication, Authorization, Accounting (AAA) server 14 for performing authentication, authorization, and accounting for users and MNs in order to allow network access and provide services to authorized users only.

The RASs 10 have their service areas, i.e. cells and provide services to a plurality of Customer Equipments (CEs) 11 within the cells, such as portable phones, Personal Digital Assistants (PDAs), and laptops. The RASs 10 transmit/receive signals to/from the CEs 11 on radio channels. The RASs 10 are also connected to the ACRs 10 by cable, each ACR being a router forming an Internet Protocol (IP) subnet. A radio signal from a CE 11 is encapsulated in an IP packet by a RAS 10 and then transmitted to an upper ACR 12'. The ACR 12' switches the IP packets to a neighbor ACR 12" close to a recipient according to the IP address of the recipient. In this manner, communications are conducted in IP packets and the recipient is located by his IP address in the conventional RAS backbone network.

As illustrated in FIG. 1, however, the conventional RAS backbone network is configured mainly with Layer 3 (L3) routers. The resulting relative high complexity in network configuration renders network management inefficient. Also, since handover occurs in L3, the handover takes much time.

SUMMARY OF THE INVENTION

A first exemplary embodiment of the present invention provides a bridge-based RAS backbone network system for facilitating network management by use of Layer 2 (L2) Ethernet bridges, enabling efficient and fast handover, and increasing network efficiency, and a signal processing method therefor.

Moreover, another exemplary embodiment of the present invention provides a method for enabling efficient paging to an MN in a RAS backbone network configured with L2 Ethernet bridges.

In accordance with the first exemplary embodiment of the present invention, there is provided a bridge-based RAS backbone network system in which a Home Location Register (HLR) manages configuration information about network entities by storing IP addresses and MAC addresses of MNs and addresses of sites to which the MNs belong in a network. The RAS network further includes a plurality of Base Station Bridges (BSBs) that are connected to a plurality of RASs, each BSB having an L2 switch, a plurality of Site Core Bridges (SCBs) that are connected to a part of the plurality of BSBs and are under the SCBs. Each SCB has an L2 switch forming a core network, exchanges frames with other SCBs in a MAC-in-MAC manner, detects a destination MN with which an MN within the sites of the SCBs requests communications by querying the HLR, and transmits a frame to an SCB to which the destination MN belongs. The RAS network also includes a plurality of SIBs that are configured as intermediate bridges between the plurality of SCBs and the plurality of BSBs. Here, each of the bridges and the HLR has a routing cache for storing location information about active-mode MNs in a soft state with aging times set for the location information according to periodic route-update messages received for registration updating from the active-mode MNs. Each of the plurality of BSBs, the plurality of SCBs, and an SIB selected from the plurality of SIBs has a paging cache for storing location information about idle-mode MNs in a soft state with aging times set for the location information according to periodic paging-update messages received for registration updating from the idle-mode MNs.

In accordance with another exemplary embodiment of the present invention, there is provided a signal processing method in a bridge-based RAS backbone network system having a plurality of BSBs connected to a plurality of RASs. Each BSB has an L2 switch. The RAS backbone network system also includes a plurality of SCBs wherein each SCB has an L2 switch forming a core network, a plurality of SIBs wherein each SIB is an intermediate bridge between an SCB of the plurality of SCBs and a BSB of the plurality of BSBs. An HLR is provided in the RAS backbone network for managing configuration information about network entities, such that an MN within the network periodically transmits to the HLR a route-update message for registration updating, if the MN is in active mode and the MN transmits to the HLR a paging-update message for registration updating, if the MN is in idle mode. The paging-update message has a transmission period longer than a transmission period of the route-update message. Each of the bridges and the HLR stores location information about the MN in a soft state with an age set for the location information in a routing cache according to the route-update message from the MN. Each of the plurality of BSBs, the plurality of SCBs, and an SIB selected from among the plurality of SIBs stores location information about the MN in a soft state with an age set for the location information according to the paging-update message received from the MN.

BRIEF DESCRIPTION OF THE DRAWINGS

The above and other aspects, features and advantages of exemplary embodiments of the present invention will be more apparent from the following detailed description taken in conjunction with the accompanying drawings, in which.

Throughout the drawings, the same drawing reference numerals should be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
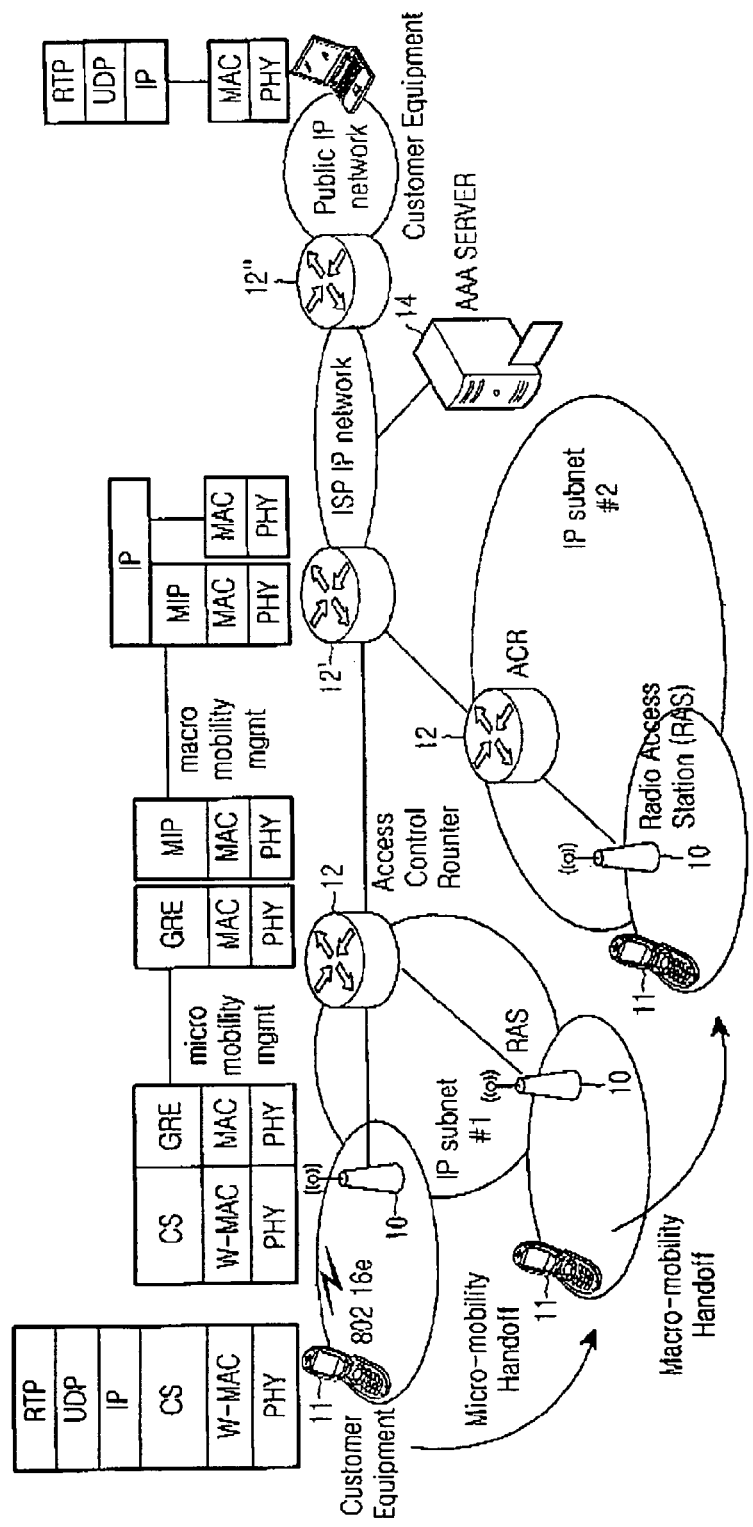
FIG. 1 illustrates an exemplary configuration of a conventional WiBro RAS backbone network.

Exemplary embodiments of the present invention are provided to configure a RAS backbone network with Ethernet bridges, compared to the conventional RAS backbone network configured with routers illustrated in FIG. 1. The Ethernet bridges of the present invention facilitate network management through increased network simplicity and enable handover to occur not in L3 but in L2, thus shortening the handover time. In L2, a Media Access Control (MAC) address is used instead of an IP address. When an MN knows only an IP address, it acquires a MAC address by broadcasting an Address Resolution Protocol (ARP) request in a conventional IP network. This point-to-multipoint broadcasting brings the ARP packet even to where the ARP packet is not needed. As a result, network efficiency is decreased due to the unneeded traffic associated with the broadcasting of the ARP packet. In this context, the exemplary embodiments of the present invention provide a network registration and communication method for suppressing ARP broadcasting and thereby increase the efficiency of an L2 network.

Figure 2:
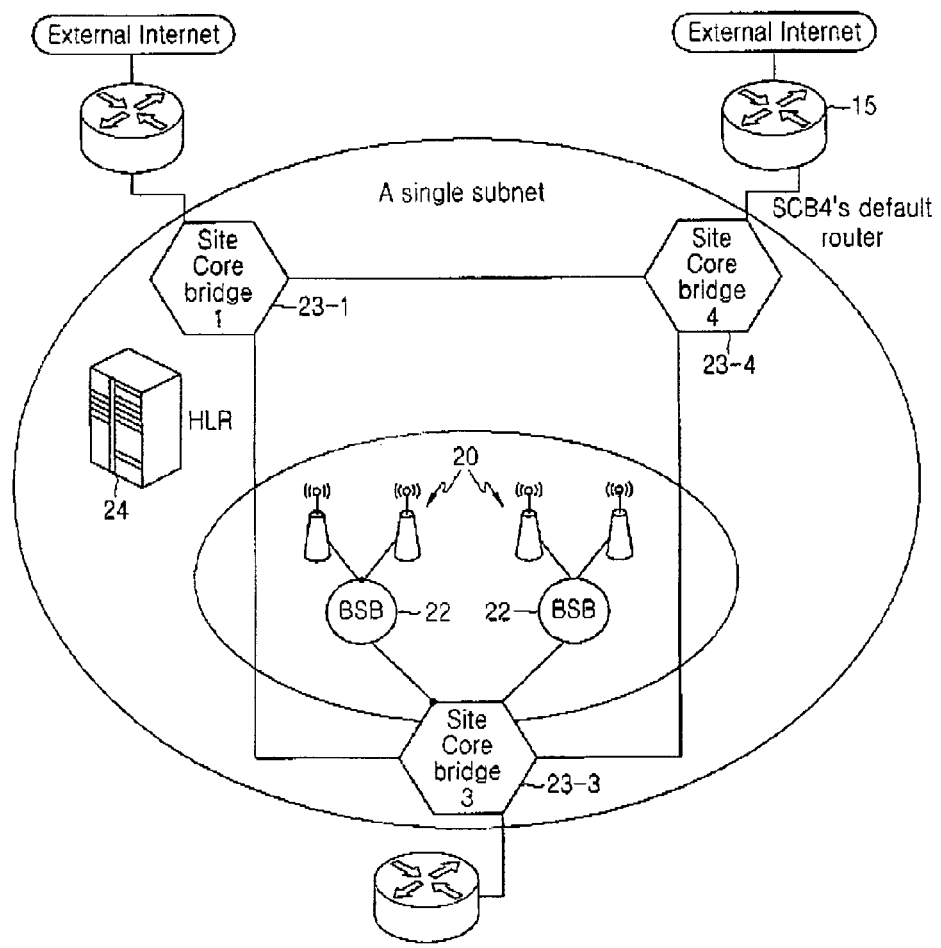
FIG. 2 illustrates the configuration of a bridge-based RAS backbone network according to an exemplary embodiment of the present invention.

FIG. 2 illustrates the configuration of a bridge-based RAS backbone network according to an exemplary embodiment of the present invention.

Referring to FIG. 2, the bridge-based RAS backbone network of the present invention includes an MN (not shown), RASs 20, Base Station Bridges (BSBs) 22, Site Core Bridges (SCBs) 23-1, 23-3 and 23-4, a Home Location Register 24, and external default routers 15.

The BSBs 22 are bridges with an L2 switch, connected to the RASs 20 and the SCBs 22 are bridges with an L2 switch, all forming a Core Network (CN).

The HLR 24 is a server for managing configuration information about network entities by storing in tables the IP addresses and the MAC addresses of all power-on MNs, and the addresses of SCBs to which the MNs belong.

1. Initialization of SCB

Referring to FIG. 1, each SCB statically acquires the MAC address of an external default router 15 connected to it, for relaying an egress frame, i.e. a frame input to it. The static MAC address setting in the SCB obviates the need for querying about the MAC address by an ARP frame, thereby reducing any ARP-caused load on the network. Also, the SCB statically registers its individual MAC address to other SCBs in the CN by 802.1ak multiple Registration Protocol (MRP), for the following reasons. Firstly, SCBs form the CN of the cellular Ethernet and there is not a great change in the CN despite a change in cells, such as cell addition. Secondly, since an operator does not have much difficulty in manually setting the MAC addresses in the SCBs, there may not be a need for an address learning function. Consequently, each SCB has knowledge of the MAC addresses of the other SCBs in the CN.

2. Initial Registration of MN

Figure 3:
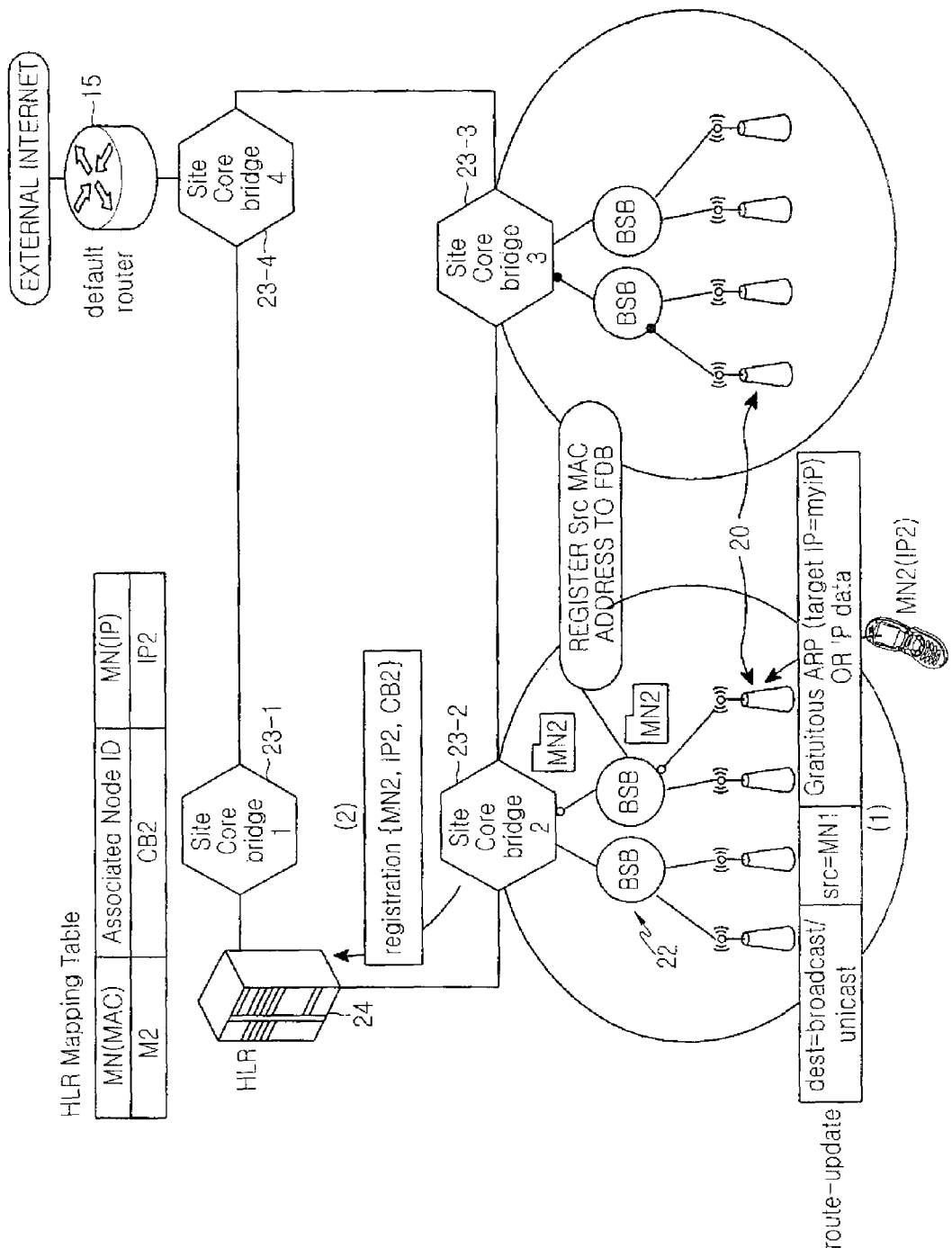
FIG. 3 illustrates an initial registration operation of an MN to the RAS backbone network illustrated in FIG. 2.

FIG. 3 illustrates an initial registration operation of an MN to the RAS backbone network illustrated in FIG. 2.

Referring to FIG. 3, when each MN (MN2 herein) initially registers to the network, it transmits a Gratuitous ARP frame with its {MAC address, IP address} to a BSB 20 connected to it in a step (1). This ARP frame is propagated upstream to an SCB 23-2 so that MN2 is registered to the Filtering DataBase (FDB) of each bridge (BSB and SCB). In a step (2), the SCB 23-2 transmits to the HLR 24 information about MN2, i.e. {MAC address of MN, IP address of MN, MAC address of SCB} on behalf of MN2, for registration to the HLR 24.

For the registration, the SCB 23-2 uses a new message formed by modifying an 802.1 Registration Protocol message for a unicast purpose, or a User Datagram Protocol (UDP)-based registration message. The HLR 24 keeps a table with information about each MN. The table can be configured so that its entries have their own aging times and are kept active by periodic registration messages before their time-out. In the illustrated case of FIG. 3, the MAC address of MN2 is set as M2, an associated SCB ID is set as CB2, and the IP address of MN2 is set as IP2 in the table of the HLR 24.

3. Intra-Site Communications between MNs

Figure 4:
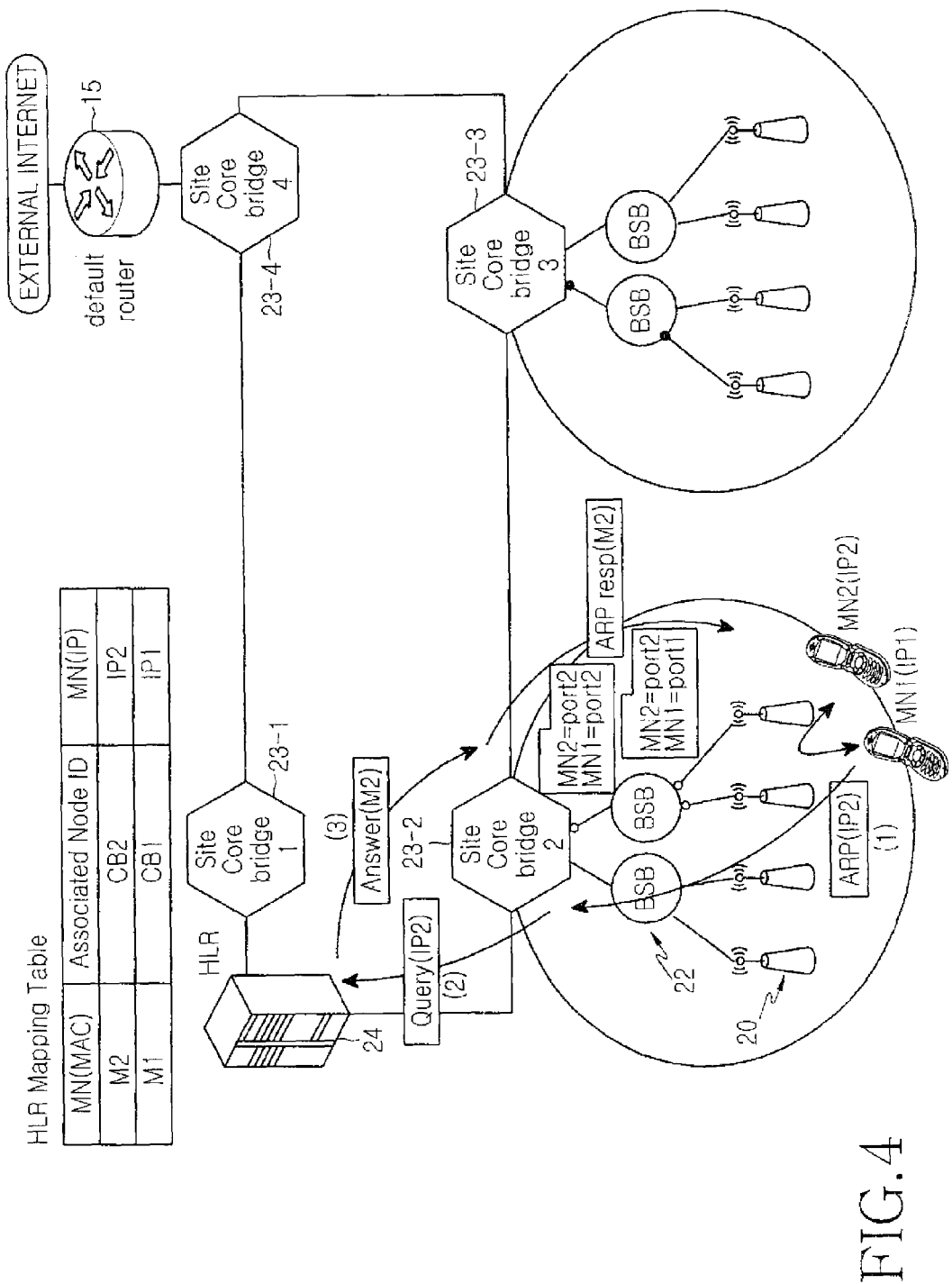
FIG. 4 illustrates intra-site communications between MNs in the RAS backbone network illustrated in FIG. 2.

FIG. 4 illustrates intra-site communications between MNs in the RAS backbone network illustrated in FIG. 2. Intra-site communications refer to communications between MNs within the same SCB in the present invention.

Referring to FIG. 4, to communicate with a peer MN, e.g., MN2 within the same site, MN1 transmits an ARP frame requesting the MAC address of MN2 by the IP address of MN2, IP2 in a step (1). The SCB 23-2 queries the HLR 24 about the MAC address of MN2 in a step (2) and acquires the MAC address of MN2 from the HLR 24 in a step (3). In a step (4), the SCB 23-2 transmits an ARP response to MN1 so that MN2 can acquire the MAC address of MN2 within the same site. Then, MN1 transmits a MAC frame to MN2 through bridging based on the MAC address of MN2 that each bridge (BSBs and the SCB 23-2) already knows in a step (5).

4. Inter-Site Communications between MNs

Each SCB has the addresses of only MNs within its site. Therefore, for inter-site communications, the SCB has to identify the site in which a Correspondent Node (CN) is located and the SCB of the site. Also, the SCN must consider the capacity of its FDB.

Figure 5:
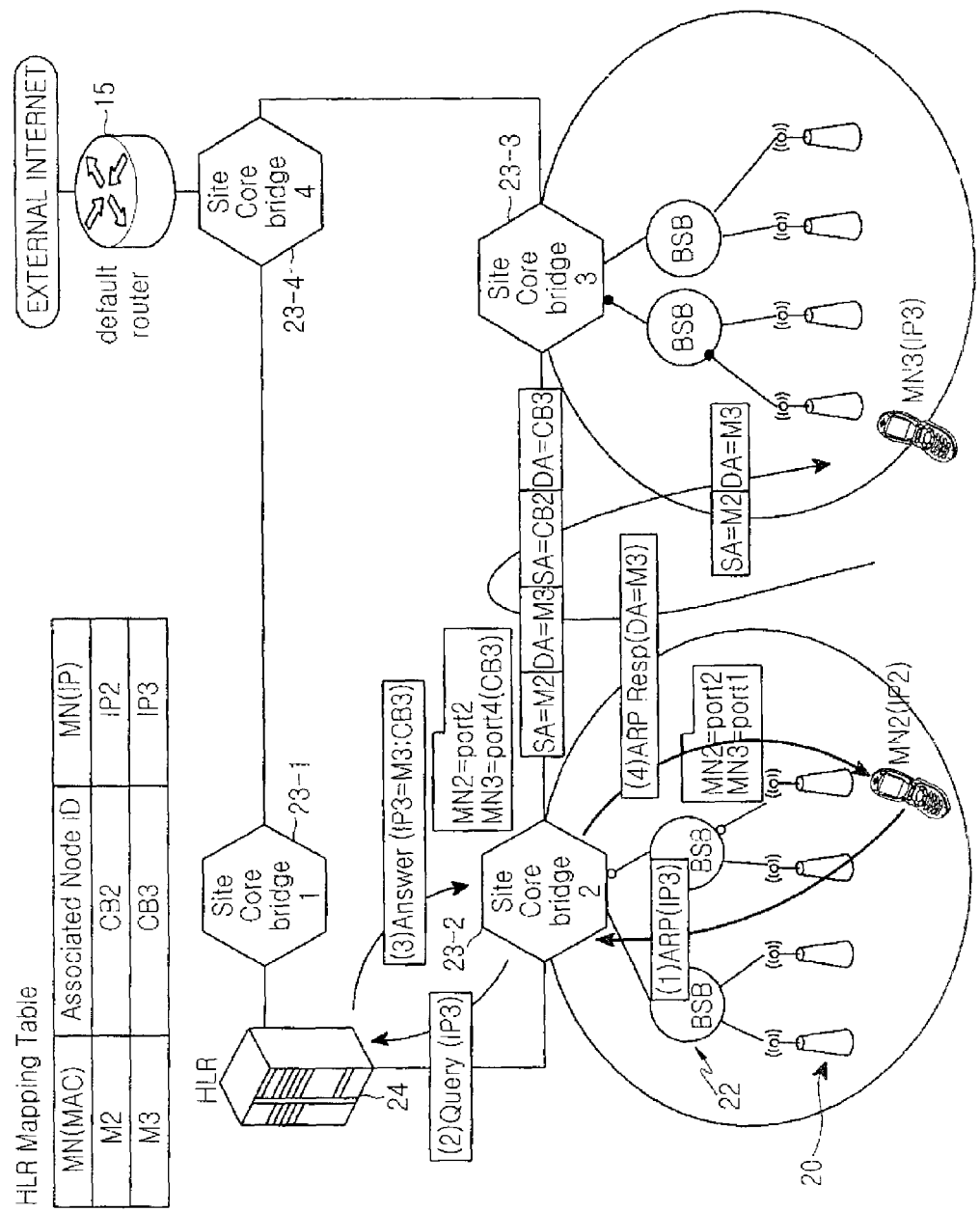
FIG. 5 illustrates inter-site communications between MNs in the RAS backbone network illustrated in FIG. 2.

FIG. 5 illustrates inter-site communications between MNs in the RAS backbone network illustrated in FIG. 2.

Referring to FIG. 2, as with the operation illustrated in FIG. 4, upon receipt of an ARP request about MN3 in a different site from MN2, the SCB 23-2 determines that the SCB 23-3 to which MN3 belongs resides in a different site from a response message received from the HLR 24 for a transmitted query in steps (1), (2) and (3). The response message includes the MAC address of MN3, M3 and the MAC address of the SCB 23-3, CB3.

In a step (4), the SCB 23-2 writes the MAC address of MN3 and information about the SCB 23-3 in a bridging table, referring to the response message and replies to MN2 with an ARP response message including the MAC address of MN3.

In a step (5), the SCB-23-2 transmits a data frame for MN3 received from MN2 to the SCB 23-3 in a MAC-in-MAC frame. The SCB 23-3 detects the MAC frame from the MAC-in-MAC frame and relays it to MN3.

That is, the SCB 23-2 transmits a data frame received from MN2 by MAC-in-MAC encapsulation. Here, the SCB 23-2 sets the MAC address CB3 of the SCB 23-3 in a Destination Address (DA) area and the MAC address CB2 of the SB 23-2 in a Source Address (SA) area of a MAC-in-MAC frame header. Upon receipt of a MAC-in-MAC frame with an outer DA set to CB3, the SCB 23-3 eliminates the outer MAC address by MAC-in-MAC decapsulation and transmits the original MAC frame to MN3.

The MAC address of each MN is written in the FDB of each bridge (including SCBs) in a soft state with an aging time set. Therefore, a large size is not required for the FDB.

In this manner, an initial registration of an MN and communications between MNs can be performed in the RAS backbone network. While not described herein, each MN can communicate with a peer MN in an external network via the default router 15.

5. Paging

In the presence of a packet directed to an idle-mode MN, paging is a function for enabling the network to locate the MN, waking up the MN, and transmitting the packet to the MN. The present invention provides an efficient paging procedure in the RAS backbone network configured with bridges, especially for paging an MN. The present invention enables the paging function to be performed even when a RAS backbone network is configured with Ethernet bridges as illustrated in FIGS. 2 to 5.

In the RAS backbone network configured as illustrated in FIGS. 2 to 5, the MAC address of each MN is written in a soft state with an aging time set for the MAC address in each bridge of a site so that it is kept active by a periodic registration message before time-out. For this purpose, a route-update message can be periodically transmitted to update the registration of an active-mode or idle-mode MN. However, this method may cause power consumption and band dissipation. In this context, the present invention provides a method for minimizing packet broadcasting to idle-mode MNs and minimizing power consumption caused by frequent transmissions of the route-update message.

For paging, an idle-mode MN must periodically tell its location. A table with information about active MNs set by route-update messages received from the active MNs in each BSB or SCB is called a routing cache and the routing cache is used to track the paths of the active MNs. The contents of the routing cache associated with a MN placed in idle mode to save power are deleted whenever no packets have been received from the MN for a predetermined time and the idle time of the MN is longer than the aging time of the routing cache in each BSB or SCB. Consequently, a packet for the MN should be broadcast, causing a waste of bandwidth.

Therefore, in addition to the routing cache in which the FDB of each bridge in an upstream path from an active MN to the HLR 24 learns the MAC address of the active MN in the soft state, the present invention defines a paging-update message destined for the HLR 24. When in an idle-mode an MN transmits the paging-update message every predetermined time longer than the aging time of the routing cache by a few times such that each bridge receiving the paging-update message can update a paging cache.

The paging cache is similar to the routing cache except that a paging cache timeout value is longer than the aging time of the routing cache by a few times. Another difference is that a paging timer is restarted by every packet transmitted by an MN, such as a paging-update packet, a data packet, and a route-update packet, whereas the routing cache is updated by only a data packet and a route-update packet transmitted by the MN. That is, after a longer time than the aging time of the routing cache, the location information about an idle-mode MN is deleted from the routing cache and is only kept in the paging cache. Every bridge may have all or selective paging caches. Hence, some nodes have two caches.

Table 1 compares the features of the paging cache and the routing cache.

TABLE 1

|  | Paging Caches (PC) | Routing Caches (RC) |
| --- | --- | --- |
| Refreshed by | All uplink packets | Data and route-update packets |
| Updated by | All update packets | Route-update packets |
| Updated when | Moving to a new paging area or after paging-update-time | Moving to a new cell or after route-update-time |
| Scope | Both idle and active MHs | Active MHs |
| Purpose | Route downlink packets if there is no route cache entry | Route downlink packets |

Figure 6A:
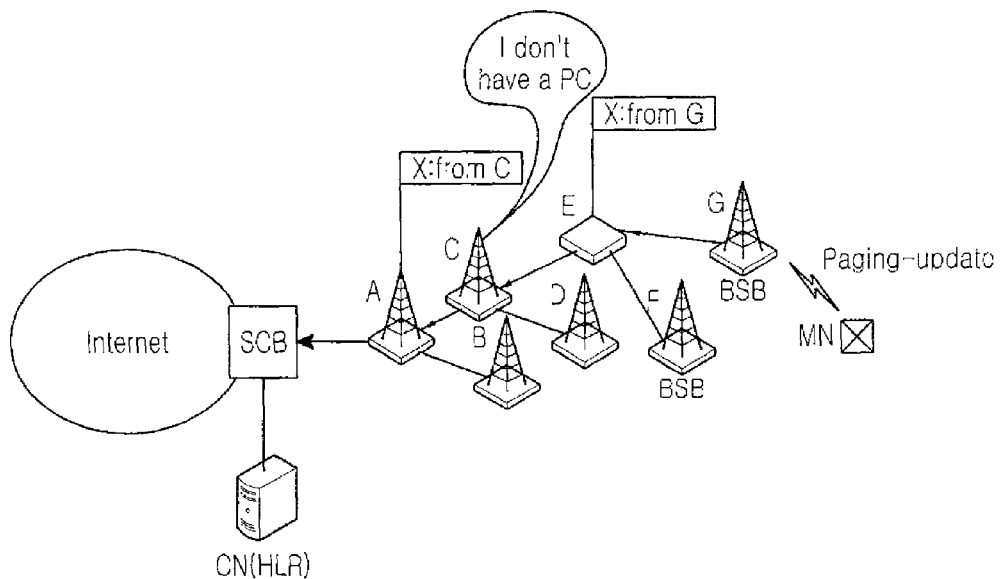
FIGS. 6A and 6B illustrate a method for paging an idle-mode MN in the bridge-based RAS backbone network according to an exemplary embodiment of the present invention.

FIG. 6A is an exemplary view illustrating transmission of a paging update message that an idle-mode MN, e.g., MNX, transmits to an HLR as a CN so that bridges G, F, and A and an SCB in an upstream path from MNX to the HLR set information about MNX in their paging caches. Some bridges, e.g., bridge C in FIG. 6A, may not have a paging cache.

Figure 6B:
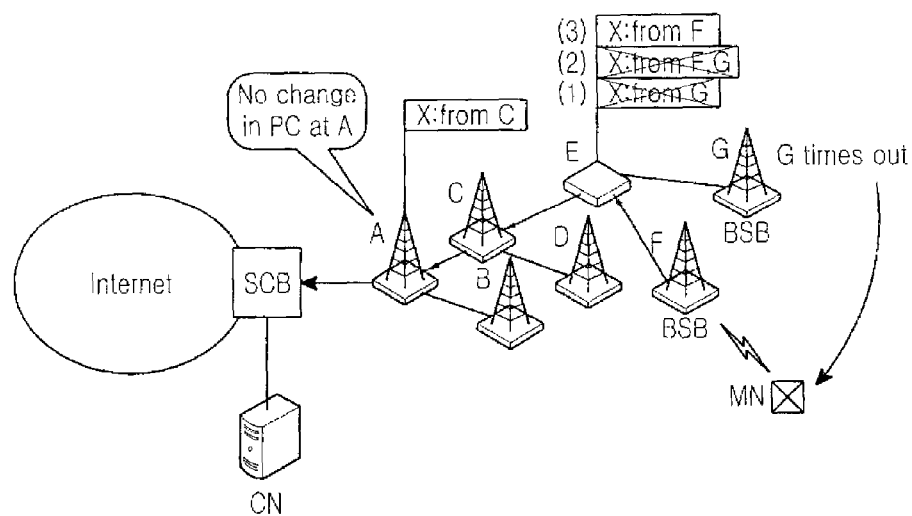

FIG. 6B is a view illustrating updating of the paging caches when MNX moves to the coverage area of another bridge in idle mode. Referring to FIG. 6B, the idle-mode MN, e.g., MNX, moves from bridge G to bridge F. The location information of MNX is updated from bridge G at a step (1) to bridge C and bridge F at a step (2) temporarily, and finally to bridge F at a step (3) in a paging cache of the first upstream bridge, bridge E. When the aging time of the bridge G information expires, the bridge F information of step (3) remains.

Now a description is provided of an operation for transmitting a paging packet to an idle-mode MN using a paging cache and a routing cache. Upon receipt of an incoming packet, each bridge relays the packet to a corresponding port by one of querying a routing cache or the HLR.

If the bridge has no associated information in the routing cache about an MN to receive the packet and the MN is in the idle mode, it buffers the packet and searches a paging cache. In the presence of information about the MN in the paging cache, the bridge relays a paging packet to a corresponding port by using the MAC address of the MN as a destination. If the paging cache does not have an entry about the MN, the bridge broadcasts the paging packet downstream. Upon receipt of the paging packet, the MN replies with a route-update message. Thus, as the routing caches of all nodes in the upstream path are updated, the packet is unicast to the MN, avoiding unnecessary packet broadcasting.

Figure 7:
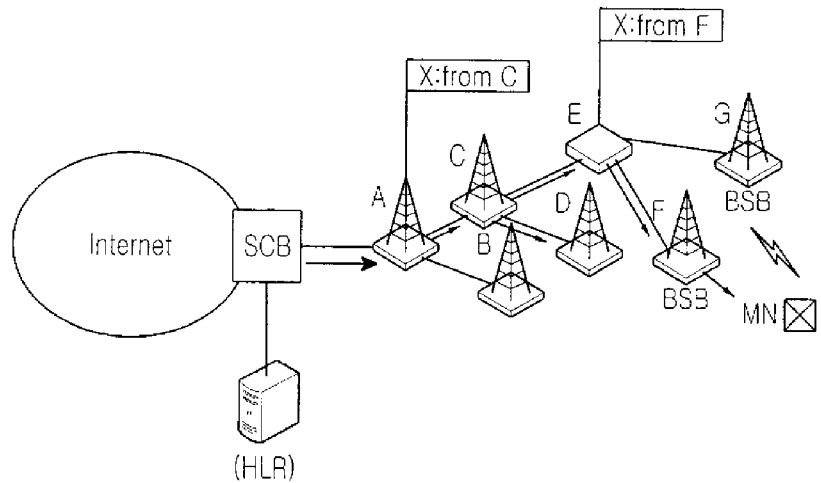
FIG. 7 illustrates a method for transmitting a paging packet to the idle-mode MN in the bridge-based RAS backbone network according to an exemplary embodiment of the present invention.

FIG. 7 illustrates a method for transmitting a paging packet to the idle-mode MN, e.g., MNX, in the bridge-based RAS backbone network according to an exemplary embodiment of the present invention.

Referring to FIG. 7, a paging packet from the HLR can be delivered to bridge C via bridge A and bridge C may not have a paging cache. In this case, bridge C broadcasts the paging packet downstream to bridge E and bridge D. Bridge E transmits the paging packet to bridge F referring to its paging cache. Finally, bridge F transmits the paging packet to MNX.

As described above, in the case where a particular bridge broadcasts a paging packet, the bridge can divide a broadcasting domain into paging areas using a Virtual Local Area Network (VLAN) and broadcast the paging packet to a corresponding paging area only, because MNX is located in a BSB neighboring to an end BSB set in the paging cache at the last time.

Figure 8:
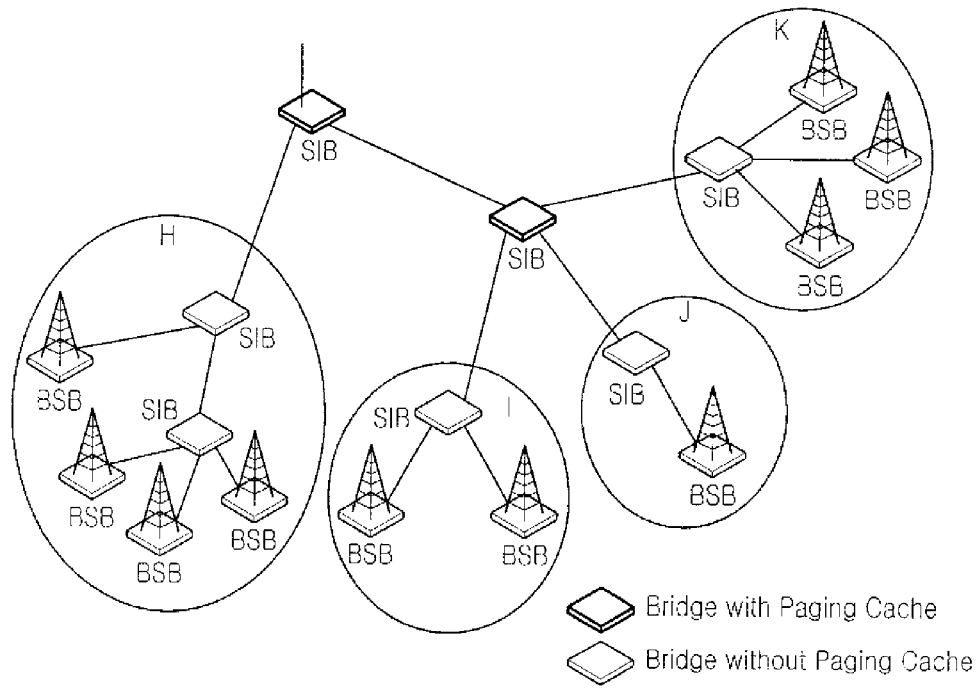
FIG. 8 illustrates a method for broadcasting a paging packet during the paging packet transmission illustrated in FIG. 7.

FIG. 8 illustrates grouping into paging areas by the VLAN. In FIG. 8, a bridge labeled with a Site Internal Bridge (SIB) is defined as an intermediate bridge between an SCB and an end BSB. Referring to FIG. 8, in the case where SIBs without paging caches, e.g., SIBs H, I, J, broadcast a paging packet, they broadcast the paging packet to corresponding paging areas predetermined by the VLAN, thereby minimizing unnecessary broadcasting.

Figure 9:
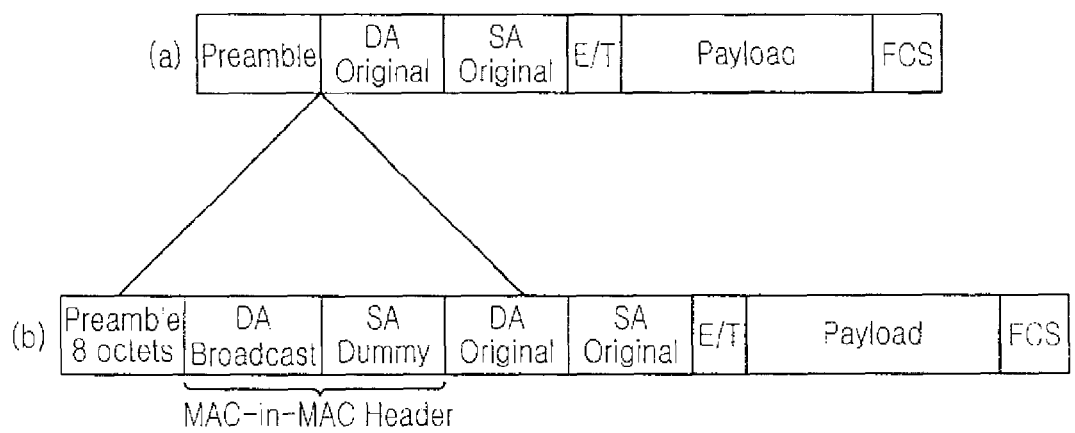
FIGS. 9A and 9B illustrate the structure of an Ethernet frame according to an exemplary embodiment of the present invention.

Since the bridge-based RAS backbone network of the present invention routes a packet using a MAC address instead of an IP address, an intended MN cannot be located unless the destination MAC address of the packet is explicitly indicated. Therefore, an Ethernet frame is configured so as to explicitly indicate a broadcasting MAC address and an original MAC address in a MAC-in-MAC manner, as illustrated in FIGS. 9A and 9B. Specifically, referring to FIG. 9A, the Ethernet frame includes a Preamble, DA Original indicating an original destination address, SA Original indicating an original source address, Ethernet Type (E/T), Payload, and Frame Check Sequence (FCS). Referring to FIG. 9B, the Ethernet frame further includes a DA Broadcast indicating a broadcasting destination address and an SA Dummy indicating a dummy source address in a MAC-in-MAC header.

Upon receipt of a packet broadcast in the MAC-in-MAC manner in a paging area, an end BSB recovers the original MAC addresses by eliminating outer MAC addresses (i.e. MAC addresses in a MAC-in-MAC header). Thus, the end BSB transmits a paging packet commanding an idle-mode MN to transition to active mode at a predetermined later time, i.e. when the idle-mode MN periodically wakes up. The idle-mode MN transitions to the active mode and starts an active-state-timer, while transmitting a route-update packet in order to fast update the routing caches of all nodes in an upstream path and thus to prevent flooding.

In the RAS backbone network using Ethernet bridges according to the present invention as described above, an MN wakes up from sleep mode and monitors a presence of a frame directed to the MN or registers its location. When the MN moves to a new BSB or a new site in the sleep mode for power saving, the current location of the MN may not be registered in an HLR. If there is a packet to be transmitted to the idle-mode MN, a paging message is broadcast to a site close to the last site to which the MN was registered, thereby minimizing an area in which the paging message is broadcast.

As is apparent from the above description, the bridge-based RAS backbone network system and the signal processing method therefor, according to the present invention, enables configuration of a RAS backbone network with L2 Ethernet bridges and renders signal processing efficient in the RAS backbone network. The resulting simple network management is simpler and paging to an MN is more efficient thereby reducing power consumption in the MN and increasing network efficiency.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A bridge-based Radio Access Station (RAS) backbone network system, comprising:
a Home Location Register (HLR) for:
managing configuration information about network entities by storing Internet Protocol (IP) addresses and MAC addresses of Mobile Nodes (MNs) and addresses of sites to which the MNs belong in a network;
a plurality of Base Station Bridges (BSBs) coupled to a plurality of RASs, each BSB having a Layer 2 (L2) switch;
a plurality of Site Core Bridges (SCBs) communicatively coupled to the HLR and connected to a part of the plurality of BSBs under the SCBs, each SCB having an L2 switch forming a core network, for:
exchanging frames with other SCBs in a Media Access Control (MAC)-in-MAC manner,
detecting a destination MN with which an MN within the site of the SCB requests communications by querying the HLR, and
transmitting a frame to an SCB to which the destination MN belongs; and
a plurality of Site Internal Bridges (SIBs) being intermediate bridges between the plurality of SCBs and the plurality of BSBs,
wherein, each of the plurality of BSBs, the plurality of SCBs, and the plurality of SIBs and the HLR has a routing cache for storing location information about active-mode MNs in a soft state with aging times set for the location information according to periodic route-update messages received for registration updating from the active-mode MNs, and
wherein, each of the plurality of BSBs, the plurality of SCBs, and an SIB selected from the plurality of SIBs has a paging cache for storing location information about idle-mode MNs in a soft state with aging times set for the location information according to periodic paging-update messages received for registration updating from the idle-mode MNs, wherein the aging time associated with the paging cache is restarted by every packet transmitted by a corresponding MN and the aging time associated with the route cache is restarted by one of: a data packet and a route-update packet, the route-update packet being transmitted by a corresponding MN and wherein each of the plurality of BSBs, the plurality of SCBs, and the selected SIB relays a packet to a destination MN, referring to information in the routing cache, relays the packet to the destination MN, referring to the paging cache, if the routing cache does not have information about the destination MN, and broadcasts a paging packet downstream, if the paging cache does not have information about the destination MN.

2. The bridge-based RAS backbone network system of claim 1, wherein a paging timeout value of the paging cache is longer than the aging time of the routing cache by a predetermined number of time.

3. The bridge-based RAS backbone network system of claim 1, wherein upon receipt of the paging packet, the destination MN replies with a route-update message such that routing caches of all upstream nodes can be updated.

4. The bridge-based RAS backbone network system of claim 1 wherein each bridge broadcasts the paging packet in a paging area predetermined from among a plurality of paging areas, the plurality of paging areas being grouped by a Virtual Local Area Network (VLAN).

5. The bridge-based RAS backbone network system of claim 3, wherein each bridge broadcasts the paging packet in a paging area predetermined from among a plurality of paging areas, the plurality of paging areas being grouped by a Virtual Local Area Network (VLAN).

6. A signal processing method in a bridge-based Radio Access Station (RAS) backbone network system having a plurality of Base Station Bridges (BSBs) connected to a plurality of RASs, each BSB having a Layer 2 (L2) switch, a plurality of Site Core Bridges (SCBs), each SCB having an L2 switch forming a core network, a plurality of Site Internal Bridges (SIBs) being intermediate bridges between the plurality of SCBs and the plurality of BSBs, and a Home Location Register (HLR) for managing configuration information about network entities, the signal processing method comprising the steps of:

if a Mobile Node (MN) is in active mode, periodically transmitting to the HLR a route-update message for registration updating by the MN within the network;

if the MN is in idle mode, transmitting to the HLR a paging-update message for registration updating by the MN, the paging-update message having a transmission period longer than a transmission period of the route-update message;

storing location information about the MN in a soft state with an age timer set for the location information in a routing cache according to the route-update message received from the MN by each of the plurality of BSBs, the plurality of SCBs, and the plurality of SIBs and the HLR; and storing location information about the MN in a soft state with an age timer set for the location information in a paging cache according to the paging-update message received from the MN by each of the plurality of BSBs, the plurality of SCBs, and an SIB selected from among the plurality of SIBs, wherein MNs aged from the routing cache for failing to timely receive a route-update message are maintained in the paging cache and an age timer associated with the paging cache is restarting by every packet transmitted by a corresponding MN and an age timer associated with the route cache is updated by one of: a data packet and a route-update message transmitted by a corresponding MN and wherein each of the plurality of BSBs, the plurality of SCBs, and the selected SIB relays a packet to a destination MN, referring to information in the routing cache, relays the packet to the destination MN, referring to the paging cache, if the routing cache does not have information about the destination MN, and broadcasts a paging packet downstream, if the paging cache does not have information about the destination MN.

7. The signal processing method of claim 6, wherein:
a paging timeout value of the paging cache is longer than the aging time of the routing cache by a predetermined number of times.

8. The signal processing method of claim 6, further comprising the step of upon receipt of the paging packet, replying with a route-update message such that routing caches of all upstream nodes can be updated, by the destination MN.

9. The signal processing method of claim 6, wherein the broadcasting step further comprises the step of broadcasting the paging packet in a paging area predetermined from among a plurality of paging areas, the plurality of paging areas being grouped by a Virtual Local Area Network (VLAN).

10. The signal processing method of claim 8, wherein the broadcasting step further comprises the step of broadcasting the paging packet in a paging area predetermined from among a plurality of paging areas, the plurality of paging areas being grouped by a Virtual Local Area Network (VLAN).

* * * * *

UNITED STATES PATENT AND TRADEMARK OFFICE
CERTIFICATE OF CORRECTION

| | | |
|---|---|---|
| PATENT NO. | : 8,059,666 B2 | Page 1 of 1 |
| APPLICATION NO. | : 11/958439 | |
| DATED | : November 15, 2011 | |
| INVENTOR(S) | : Jae-Hun Cho et al. | |

It is certified that error appears in the above-identified patent and that said Letters Patent is hereby corrected as shown below:

Column 9, Claim 2, Line 8 should read as follows:
-- ...number of times. --

Signed and Sealed this
Tenth Day of July, 2012

David J. Kappos
*Director of the United States Patent and Trademark Office*